United States Patent
Gausland

[11] Patent Number: 5,086,339
[45] Date of Patent: Feb. 4, 1992

[54] VIDEOSYSTEM FOR DETERMINING POSITION OF COLORED AREAS

[75] Inventor: Ingebret Gausland, Stavangel, Norway

[73] Assignee: Den norske stats oljeselskap a.s., Norway

[21] Appl. No.: 593,515

[22] PCT Filed: Feb. 29, 1988

[86] PCT No.: PCT/NO88/00015
§ 371 Date: Dec. 6, 1988
§ 102(e) Date: Dec. 6, 1988

[87] PCT Pub. No.: WO88/06767
PCT Pub. Date: Sep. 7, 1988

Related U.S. Application Data

[63] Continuation of Ser. No. 477,181, Feb. 5, 1990, abandoned, which is a continuation of Ser. No. 269,532, Dec. 6, 1988, abandoned.

[30] Foreign Application Priority Data
Mar. 2, 1987 [NO] Norway .................. 870841

[51] Int. Cl.$^5$ .................. H04N 9/77
[52] U.S. Cl. .................. 358/81; 358/30; 358/39; 358/80
[58] Field of Search .................. 358/30, 39, 44, 41, 358/75, 80, 81, 98; 382/17

[56] References Cited

U.S. PATENT DOCUMENTS

| 3,882,446 | 5/1975 | Britian et al. | |
|---|---|---|---|
| 3,967,235 | 6/1976 | Dennis et al. | |
| 4,236,233 | 11/1980 | Davis et al. | 357/31 |
| 4,597,006 | 6/1986 | Orsburn | 358/80 |
| 4,636,839 | 1/1987 | Cole et al. | 358/81 |
| 4,707,727 | 11/1987 | Penney | 358/80 |
| 4,718,089 | 1/1988 | Hayashi et al. | 382/17 |
| 4,721,998 | 1/1988 | Glenn | 358/30 |
| 4,731,663 | 3/1988 | Kovalchick et al. | 358/101 |
| 4,797,738 | 1/1989 | Kashi et al. | 358/101 |

FOREIGN PATENT DOCUMENTS 0141093 7/1985 Japan .................. 358/81

OTHER PUBLICATIONS

Patent Abstract of Japan, vol. 9, No. 273 (P-401), Abstract of JP 60-117375, publ. 1985-06-24.

Primary Examiner—James J. Groody
Assistant Examiner—Kim Yen Vu
Attorney, Agent, or Firm—Lucas & Just

[57] ABSTRACT

Video system for detection of colored areas on black/white patterned background which comprises a video camera for formation of a set of primary color signals R, G, B and a signal processing unit, which provides information about the recorded area based on a processing of one or more of the signal difference (R-Y), (B-Y), (G-Y) between the primary color signals R, G, B and luminance signal Y. The system can particularly be used for digitalizing of interpreted seismic sections.

7 Claims, 4 Drawing Sheets

VIDEOSYSTEM FOR DETERMINING POSITION OF COLORED AREAS

This is a continuation of application Ser. No. 477,181, filed Feb. 5, 1990, now abandoned which is a continuation of application Ser. No. 269,532, filed Dec. 6, 1988, now abandoned.

The present invention concerns a video system for the detection and indication of the position coloured areas on a picture surface with a black/white patterned background. The invention particularly concerns a video system for digitalising of interpreted seismic sections.

In certain cases, there is an interest for processing information which occurs as coloured lines, dots or patches on a black/white patterned background. An example of such information material is so-called interpreted seismic sections. During the interpretation of seismic sections, interesting structures are marked by hand with for instance, coloured pencils. If this type of material is to be stored in or treated by electronic data systems, the information must be registered in the data systems with the help of, for instance, digitalising tablets. This work is both time-consuming and monotonous.

The system for digitalising of information which presents itself as dots, lines and patches, based on the use of video and digital technique is known. However, conventional video-digitalising systems have turned out to be of no use in cases as described above, where the colour signals have to be received from a closely patterned black and white background.

One of the aims of the invention is therefore to provide a system which, in a simple manner, makes it possible to determine the position of coloured patches on a black/white background by using video technique. In FIG. 1 an example is shown where information is presented in this way, the figure representing an interpreted seismic section. The interpretation of such sections is carried out manually, by indicating directly on the section different structures by colouring, for instance with coloured pencils. In FIG. 1 the coloured areas (c1, c2) are marked with broken lines. The colours in areas can be identical or different.

Black/white and colour information in such material, for instance interpreted seismic sections, can be captured by a video colour camera. In order to specify the colour information in a video signal from a video colour camera, use is often made of the "CIE" diagram, as shown in FIG. 2. ("CIE": Commission Internationale de l'Eclairage). According to this diagram different colours can be represented by a vector centered around white, with co-ordinates $x=0.310$, $y=0.316$. The phase angle of this vector specifies the colour, and the distance from the centre indicates colours such as primary colours, and by mixing these, most of the colours represented in the diagram can be created. In standard video systems, the following colours are utilized as primary colours:

| primary colour | wave length | co-ordinates in the "CIE" diagram |
| --- | --- | --- |
| red | 610 mm | $x = 0.67$ $y = 0.33$ |
| green | 535 mm | $x = 0.21$ $y = 0.71$ |
| blue | 470 mm | $x = 0.14$ $y = 0.88$ |

The luminance of a colour signal is determined by the intensity of each of the primary colours in the signal. A point with the co-ordinates $x=0.30$, $y=0.16$ (white) will thus be perceived as black, grey or white according to the intensity of the components of the primary colours. For the purpose of representing the luminance in a colour signal, the "CIE" diagram may be conceived as a three-dimensional co-ordinate system in which the intensity of the colour signal is represented as the third co-ordinate axis.

If a video camera is used to record an object, for example a flat surface wherein a substantial amount of the colour information exists as a relatively finely masked black and white pattern, the luminance signal will fluctuate rapidly during scanning of the image according to the changes between black and white surfaces on the object. In a video signal from a video camera recording such an object, the signal intensity of each primary colour will change at a rapid rate from a very low value, corresponding to black, and towards a maximum value, corresponding to white. In the "CIE"diagram in FIG. 2 this corresponds to a condition in which the vector components of each primary colour in relation to the locus for white ($x=0.310$, $y=0.316$), rapidly alternate between their minimum and maximum values.

Signals derived from coloured areas on a black/white patterned surface, for instance an interpreted seismic section, will in many cases have a lower amplitude than the signals which are caused by black and white backgrounds.

Since the colour signals "drown", so to speak, in the black/ white background, the detection of such colour signals becomes more complicated in conventional video systems. Such a technique has been seen to be unsuitable for digitising of interpreted seismic sections.

According to the present invention, a video system for detection and positioning of coloured areas on a black/white patterned background is provided.

Positioning in this context means an indication of the coloured areas position in relation to specific axis of reference for the recorded object. The position indication can exist as analogue signals, for instance processed video signals or digital sets of data.

The invention will be more closely described with reference to two embodiments, where:

Figure 1:
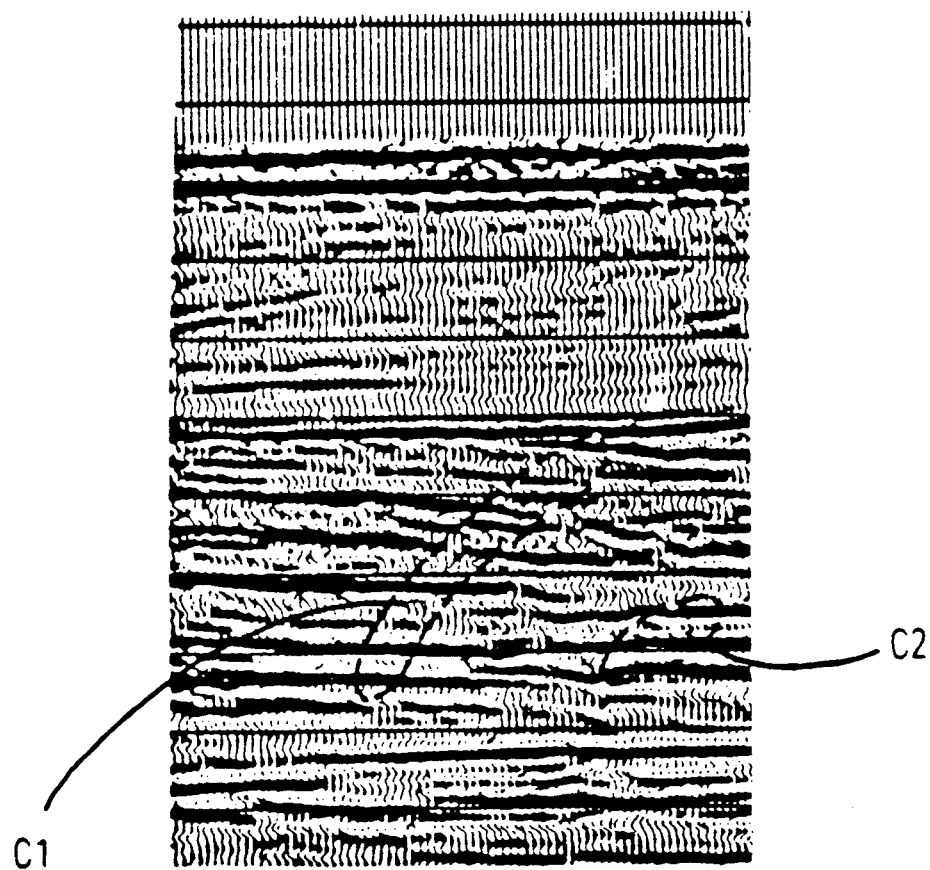
FIG. 1 represents an interpreted seismic section.
Figure 2:
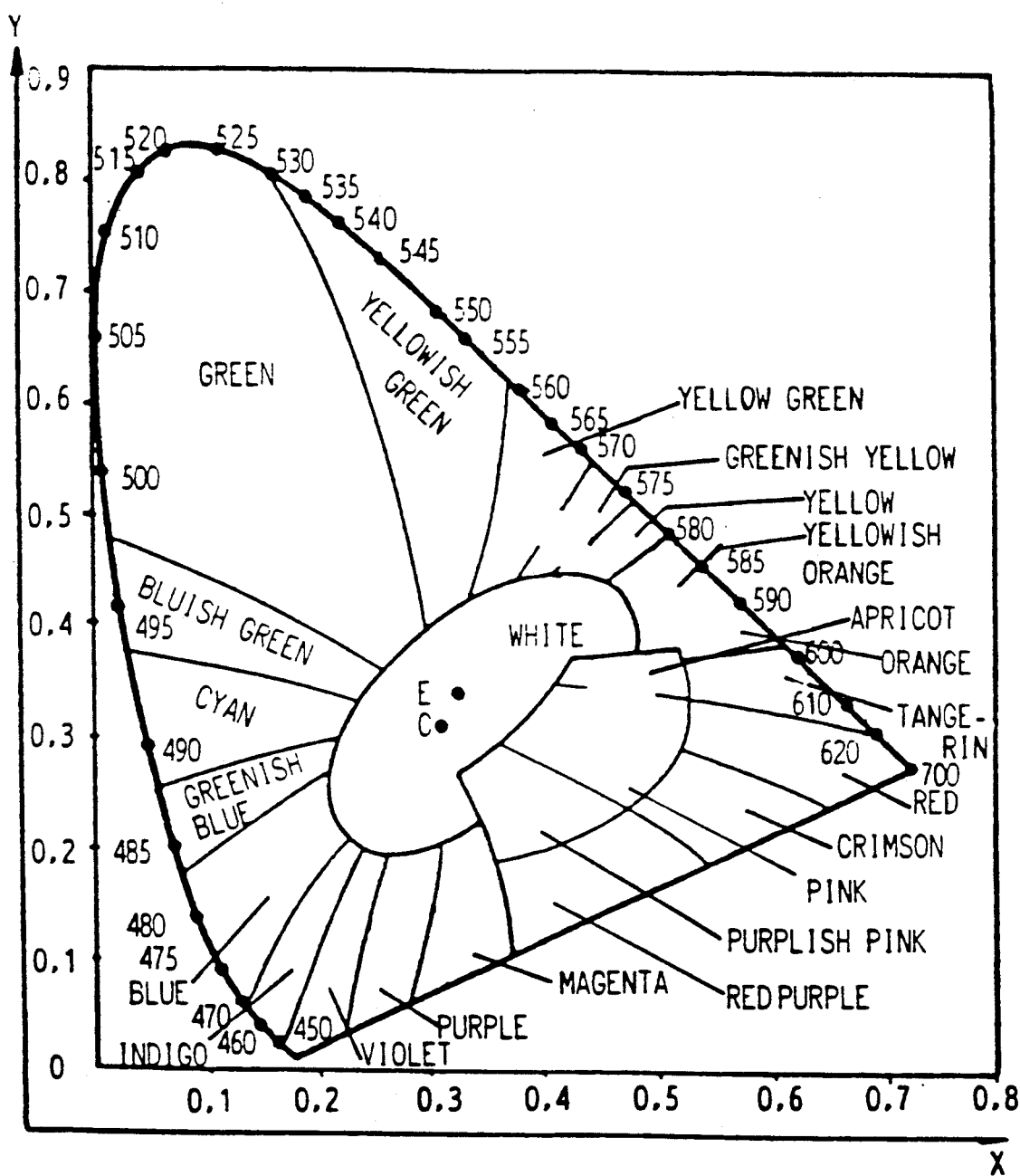
FIG. 2 shows a diagram of each primary color in relation to a locus for white ($x=0.310$, $y=0.316$).
Figure 3:
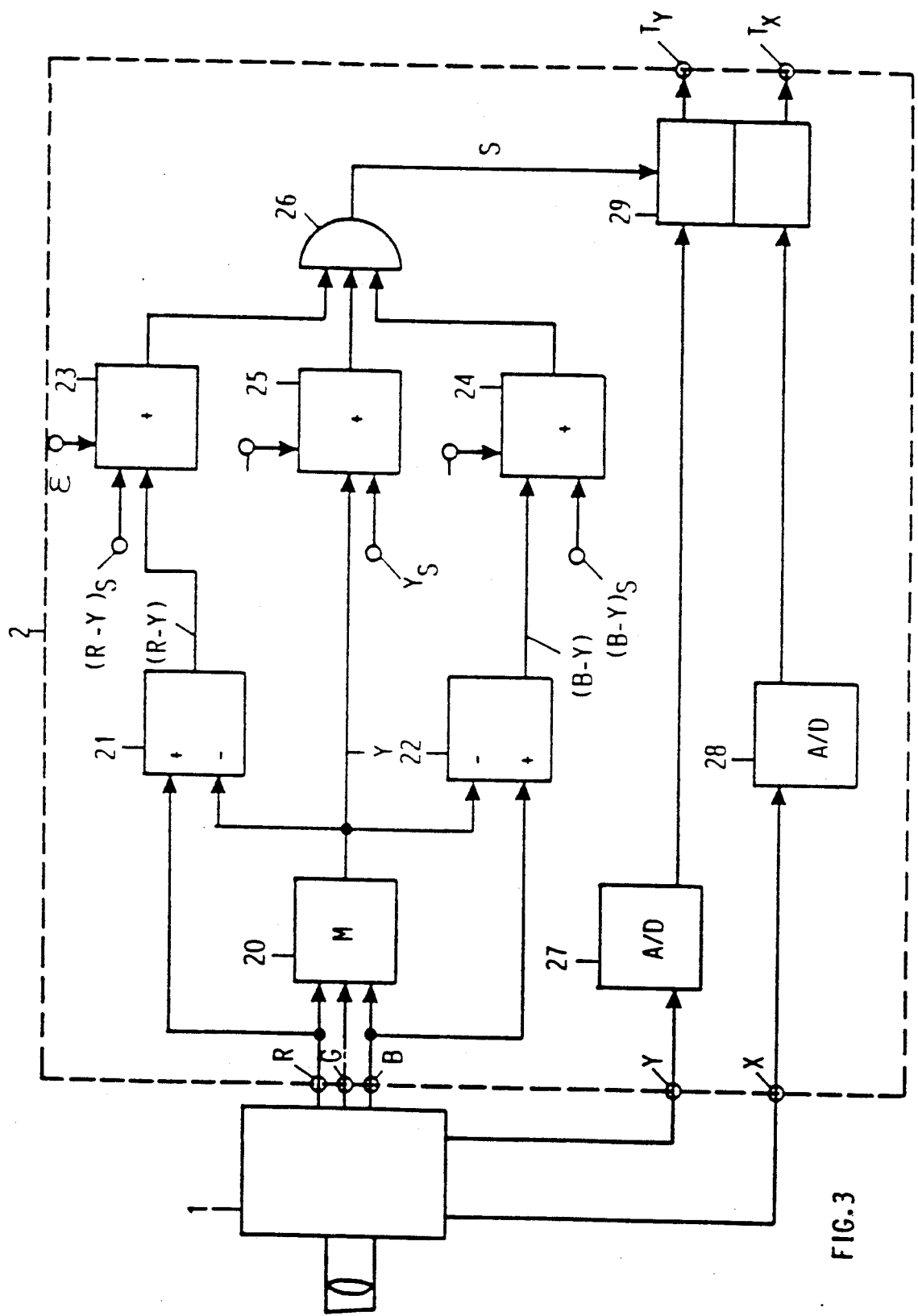
FIG. 3 shows a schematic diagram for a first embodiment.

The video system, according to the first embodiment, includes a colour video camera (1) and a signal processing unit (2) as shown in FIG. 3.

Any type of camera can be used, as long as the camera is capable of providing a set of signals (R, G, B) which represent the primary colours in the relevant video system. The camera can therefore be an analog camera, where the colour separation is carried out by means of prisms and read off takes place in the "plumbicon" tube and where the signals for the primary colours are available simultaneously.

The RGB output from the camera (1) is supplied to and processed by the signal processor (2).

In a Y-matrix (20), the R-, G- and B-signals are combined in a conventional manner to produce the luminance signal Y. The luminance signal $Y=rR+gG+bB$, where r=0.30, g=0.59 and b=0.11. For RBg signals for white, black or pure shades of grey, Y=R=G=B, according to the above expression, if the Y-matrix is properly adjusted.

A first and a second comparator (21, 22) facilitate the formation of the difference signals (R−Y) and (B−Y) in that two of the primary colour signals, in this case R and B, are obtained from the input to the signal processing unit and supplied to the non-inverting (+) inputs to the respective comparators, whilst the Y-signal from the Y-matrix (20) is supplied to the inverting (−) inputs.

The output from the first comparator (22) is connected to one of the two inputs to a third comparator (23). To the other input to this comparator a signal (R−Y), is supplied which corresponds to the difference between one of the primary colour signals, in this case R, and the luminance signal of the colour which is desired to be recorded by means of the video system, hereafter called the reference colour. The comparator (23) is of the type which provides a logic signal 1 if the difference between the signals on the input side does not exceed a threshold value, and a logic signal 0 if this condition is not met. The deviation value must be adjusted so that sufficient separation between the colours desired to be recorded is achieved.

A fourth (24) and a fifth (25) comparator is in a similar way connected to the second comparator (21) and to the Y-matrix (20), respectively. Thus, with the fourth comparator a comparison is made between the measured difference signal (B−Y) and the difference signal (B−Y)$_s$ for the reference colour, whilst measured luminance Y is compared with the reference luminance Y$_s$ in the fifth comparator.

All of the logic output signals from the third, fourth and fifth comparators are supplied to the input on a logic AND-gate (26). The AND-gate (26) produces a logic signal S which is equal to 1 when all of the inputs are equal to 1, otherwise S=0. The signal S will control the recording of (2) deflection signals (x,y). This occurs in the following manner:

The deflection signals (x,y) from the camera's (1) deflection oscillators supply each A/D convertor (27) and (28). In the converters, the analog deflection signals are transformed into digital values. Converters with 12 bits resolution will be more than sufficient for most purposes. If a lower resolution is acceptable, simpler and cheaper converters can be used, for example 8 bits resolution.

Data from the output of the A/D converters (27, 28) is transferred to the input side of the signal processor's (2) output unit (29). This unit functions as a gate which at a signal from the AND-gate (26) presents data (T$_x$, T$_y$ from the A/D converters (27, 28) on the output side of the unit.

In its simplest form, the unit (29) can consist of two rows of bistable flip-flops, one row for each of the data-channels which connect the A/D converters (27, 28) with the output unit (29), where the bistable flip-flops are triggered by a logic output signal (S=1) from the AND-gate (26). More sophisticated output gates (29) can consist of temporary storage for data which is to be retrieved out of the signal processor unit and the control circuits for output of data, for instance, so that the output unit responds to queries from external data processing units.

In the above described signal processor unit, the Y-matrix (20) and the first and second comparators (21 and 22) facilitate the formation of the difference signals (R−Y) and (B−Y).

If the RGB-signals from the camera (1) only contain pure black/white signals, or pure shades of grey, then (R−Y)=)B−Y)−0. This corresponds to a situation where, by way of example, the camera records the black/white picture surface in a seismic section in an area where colours are not present. If the reference signals have a saturation exceeding a certain minimum, the subsequent comparators (23-25) and the AND-gate enable the output unit (29) to block the transfer of signals (T$_x$, T$_y$) from the output unit.

If electron beams in the camera (1) record an area in the picture surface which is different than pure black, white or grey, the (R−Y) and (B−Y) signals from the respective outputs of the first and second (21 and 22) comparators will be equal to the difference between the relevant basis colour component and the luminance in the recorded area. Together with the luminance signal Y, these signals will be compared with corresponding reference values (R−Y)$_s$, (B−Y)$_s$ and Y$_s$ for the colour desired to be detected in the third, fourth and fifth comparators (23, 24 and 25). If the recorded signals and reference signals are within certain limits determined by the tolerance signal ($\epsilon$) the comparators (23-25) will simultaneously provide logic signals equal to 1 to the input of the AND-gate (26), which then permits transference of data from the output unit's (29) input side to its output side. The output unit thus supplies information about the position of a detected and predetermined colour in the camera's (1) picture surface.

The AND-gate (26) contributes to a suppression of sporadic signals which are detected in one or two of the comparators (23-24). This could otherwise be a considerable problem for the reliability of the signal processing unit (1) when the camera is recording picture surfaces with low luminance, for instance when the camera's electron beam records an area which corresponds to a dark or black background.

The reference signals (R−Y)$_s$, (B−Y)$_s$ and Y$_s$ can be produced in the most simple way by focusing the camera's lens on to an area which is coloured with the colour desired to be registered, and then regulating the output voltage to voltage sources for each of the reference signals (R−Y)$_s$, (B−Y)$_s$ and Y$_s$ so that all of the comparators provide a logic signal 1. The voltage sources are utilized afterwards as reference signals for the comparators (23-24). During the adjustment of the reference voltages, the tolerance signal should preferably be set at a low level. (The mentioned voltage sources are not own in any of the figures.)

In another embodiment the signal processing unit (2) can comprise the Y-matrix (20) and the AND-gate (26) connected as described above as well as a microprocessor based system for control and steering of the video system. Such an embodiment is illustrated in FIG. 4.

As opposed to the previously described embodiment the deflection signals in the signal processing unit (2) are generated here by two digital counters (37, 38), one for each of the deflection signals, in combination with D/A-convertors (32 and 33). The counters (37, 38) are driven by clock pulses (CLK$_x$) and (CLK$_y$) which are adapted to a suitable scanning velocity for the camera's (1) electron beams, for instance 50 or 60 images per second, as in standard video cameras. Likewise, the amplitude of the output signals from the D/A-convertors is adapted to the camera's (1) deflection electronics. By connecting the outputs of the D/A-convertors (32, 33) to the camera's deflection electronics, the deflection of the camera's (1) electron beams can be controlled by the signal processing unit (2). For this it is necessary that the camera (1) is of a type without built-in deflection oscillators, or that these can be turned off.

Figure 4:
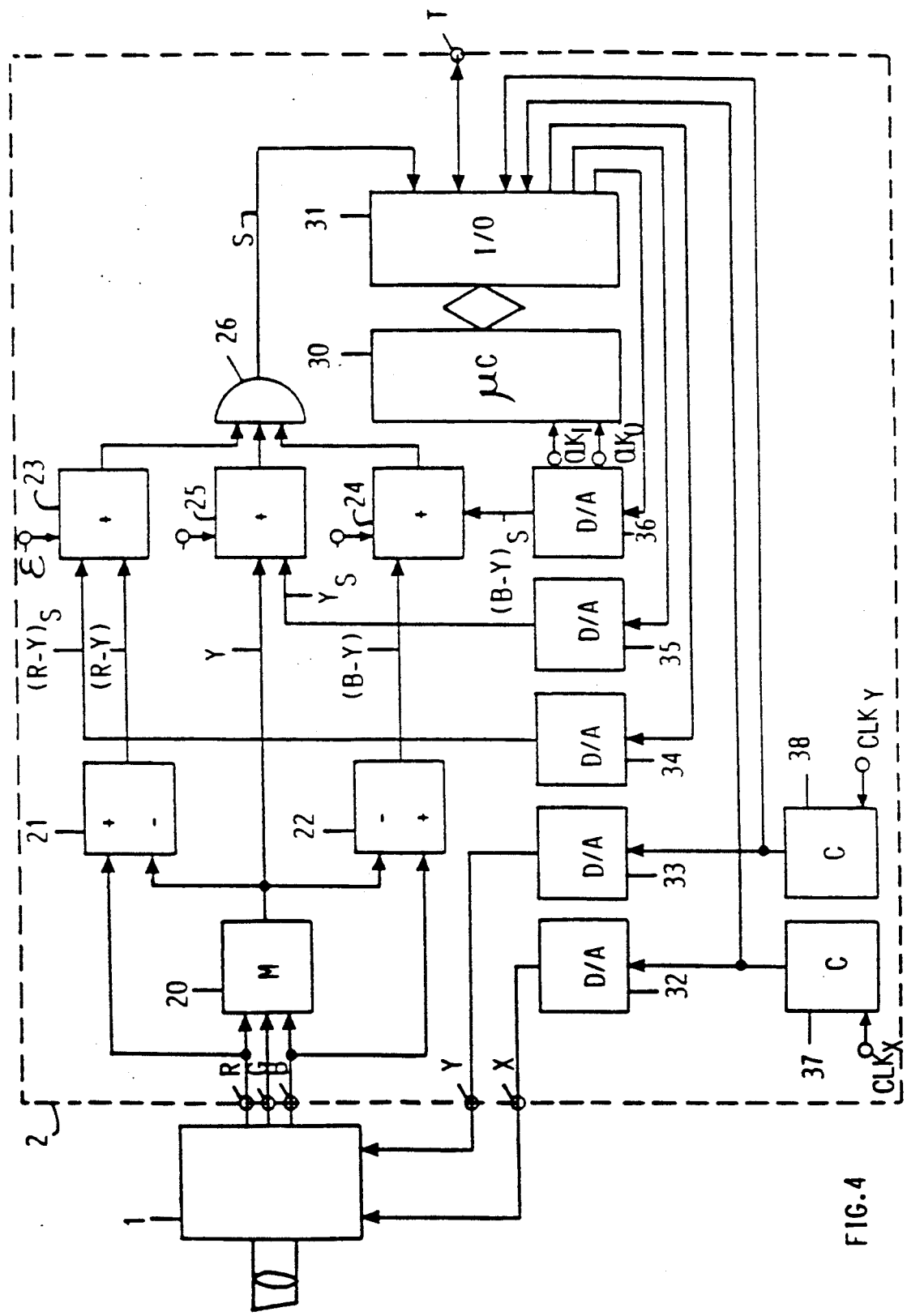
FIG. 4 shows a schematic diagram for a second, microprocessor based embodiment.

In the microprocessor based signal processing system according to FIG. 4, the microprocessor (30) controls the transference of signals to and from several parts in the video system. This control is provided via an in/out unit (31) which communicates with a microprocessor (30) in both directions, as indicated by the arrow between the circuits (30) and (31). The microprocessor (30) processes the signals, which are supplied by the in/output circuit (31) in the form of data words of suitable length, for instance 8 or 16 bits. The processing of received data takes place according to a program which is stored in the microprocessor's memory. The micro processor's memory can be placed on the same chip as the microprocessor itself or outside this, as separate units (not shown). Likewise, necessary clock pulses can be generated internally in microprocessor, or else these signals can be provided by separate oscillators, as indicated in FIG. 4 ($CLK_i$) Outgoing clock pulses ($CLK_o$) from the microprocessors can be used to drive the counters (37, 38) after a suitable transformation of the pulse rate.

The microprocessor (30) is connected via the in/out-unit (31) with three D/A convertors (34, 35, 36), which supply the reference signals $(R-Y)_s$, $(B-Y)_s$ and $Y_s$ to the third, fourth and fifth comparators (23, 24, 25). The D/A convertors (34-36) are of a type which provide a constant output signal until a message about a new value is registered on the input side. The D/A converters (34-36) only need to be updated once for each change of reference colour. The reference signals' $(R-Y)_s$, $(B-Y)_s$ and $Y_s$ level is thus controlled from the microprocessor (30).

Moreover, the microprocessor (30) is, via the in/out-unit (31), connected to the output of the AND-gate (26) and to the output of the counters (37, 38) which control the deflection signals to the video camera (1).

The program of the microprocessor (30) can also provide calibration of the system in relation to reference colours and detection of colours which coincide with the reference colours.

The sub-routine for calibration of the system can be formulated in accordance with the calibration procedure described in connection with the first described embodiment, where the reference signals $(R-Y)_s$, $(B-Y)_s$ and $Y_s$ are adjusted to corresponding signals during the recording of a reference colour.

The detection sub-routine is to be employed for recording and if desired, processing and transference of data to the signal processing unit's output terminal (T) when the signal from the AND-gate (26) communicates that the registered colour corresponds to the reference colour, i.e. when S=1.

The output signal (T) shall contain the desired information about registered colour, and the position of detected colour area in relation to a given co-ordinate system in the picture plan of the video camera. The output terminal (T) can permit two-way communication with the world outside, and this makes it possible to collect information from outside the signal processing unit on "interrupt" from a data system of a higher level. However, this can mean that the microprocessor unit (30) in the signal processing units must be provided with a larger memory for temporary storage of data.

Several data transfer channels in both FIG. 3 and FIG. 4 are indicated by single lines. If these lines are not adapted for serial transfer, it should be understood that in this context, the data transference lines in the diagram represent sets of parallel lines, that is data buses. By making the components with which the microprocessor is to communicate addressable, it will be possible for several of the components to use the same "data bus".

It is preferable that the microprocessor (30) responds immediately to a request when the output signal S changes from logic "off" (S=1) to logic "on", i.e. that the microprocessor (30) is "interrupt-driven" as regarding the output signal from the AND-gate (26).

A microprocessor driven system will have several advantages compared with a more simply constructed system, as described initially. The microprocessor can process data to a certain extent before presenting it to the system's output terminals. It can for instance be desirable to make adjustments to the measurement results to make allowance for the time-delay which occurs as a result of the signals' travelling through different branches of the system. Further, calibration of the detector part (23-26) of the system can take place according to the microprocessor's program instructions and read-off of several colours can be controlled from the microprocessors so that detection of several colours can take place automatically. The microprocessor can take over other functions in the system, if desired in combination with other components. An example of such a use of the microprocessor is described above in connection with the suggested deflection of the camera's (1) electron beams, where the counters (37, 38) and the D/A-converters (32, 33) eliminate the need for deflection oscillators in the camera (1).

The choice of video camera (1) is in other respects not critical. For example, an analog camera can be used, where the colour separation is carried out by means of prisms and read-off takes place in the "Plumbicon"-tube. All three colour signals will in this case be available simultaneously. A digital camera can also be used, where the colour separation is carried out with a filter and read-off is done by an array of photo sensitive sensors. With such cameras the image will be recorded three times, once for each primary colour. A digital camera (1) will be at hand to combine with a microprocessor-based signal processing unit (2). As mentioned above, the microprocessor will be able to control or take over the function of other components in the video system, for instance, steering of electron beams and choice of filter in the video camera (1).

If the recording is taken of an object or an image surface which is still, for example an interpreted seismic section, the high picture-change frequency in standard video systems is unnecessary. In recording of such "still pictures" lower oscillator frequencies and therefore reduced band widths can be permitted. For such purposes the equipment can be both cheap and simple.

If desired, the signal processing unit (2) can be built into the housing of the video camera (1).

The video system as described above is particularly suitable for digitalising of interpreted seismic sections. For such a purpose an interpreted seismic section is recorded by the video camera (1) and the video signals are processed, as described above, in the signal processing unit (2). Indicated areas, traced manually as coloured strokes and patches, will exist on the output side of the signal processing unit (2) as a set of given positions in a predetermined co-ordinate system, for example in the form of "SP-t"-pairs.

A method for digitalising of seismic sections with the use of video system is based, according to the invention, on pure colour separation and there is no demand for special colours, for example fluoridising pigments, for marking of the interpretation on the sections. However a good colour saturation of the colour used for marking will make detection more certain and reduce the possibility of error.

The source of light will be critical for detection of each of the colour components. If the source of light varies in time, and this it will usually do, the colour line will move in the CIE-diagram. This can be compensated for by the system being calibrated against the relevant colours which are used in each scanning.

By also using pattern recognition methods, information can be entered into the sections and read off directly (such as time scales, line numbers, shot point etc.). This will to a considerable extent automize the digitalising process and make the transfer to the computer for further processing quicker and more accurate.

I claim:

1. Video system, particularly for digitalising of interpreted seismic sections, characterised in that said system comprises:
   A. a video camera (1) for formation of a set primary colour signals (R, G, B), and
   B. a signals processing unit (2), which comprises
      a) a Y-matrix (20) and comparators (21, 22) for formation of one or several difference signals $(R-Y)$, $G-Y)$, $(B-Y)$ and a luminance signal (Y),
      b) comparators (23, 24) which compare the difference signals $(R-Y)$, $G-Y)$, $(B-Y)$ with corresponding difference signals $(R-Y_s$, $(G-Y)_s$, $(B-Y)_s$ for a reference colour, and which are capable of providing a logic signal equal to 1 if the difference signals provided to the appropriate circuit are more or less of the same size,
      c) a comparator (25) which compares the luminance signal (Y) with a corresponding luminance signal $(Y)_s$ for a reference colour, and which is capable of providing a logic signal equal to 1 if the luminance signals (Y) and $(Y)_s$ are more or less of an equal size,
      d) a logic AND-gate (26) which is provided with the output signals from the comparators according to points b) and c), and which provides a logic signal (S) depending on the output signals from the comparators (23, 24, 25),
      e) two A/D-convertors (27, 28) which transform horizontal and vertical deflection signals (x and y) into corresponding digital signals, and,
      f) an output unit (29) which is controlled by the signal (S) from the logic AND-gate (26), and which is capable of providing signals $(T_x, T_y)$ based on the output signals from the A/D-converters (27, 28).

2. Video system, particularly for digitalising of interpreted seismic sections according to claim 1, characterised in that said system further comprises:

3. Method for digitalising of interpreted seismic sections, characterised in that a video system according to claim 2 is used.

4. Utilization of the video system according to claim 2 for digitalising of interpreted seismic sections.

5. A video system for detecting and positioning of colored areas, said system comprising:
   (a) a video camera for capturing colored information and forming a set of primary color signals, R, G and B; and
   (b) a signal processing unit for processing said primary color signals and assigning a position to said primary color signals, said signal processing unit comprising:
      (1) means for generating a first set of signal differences $(R-Y)$, $(B-Y)$, $(G-Y)$ between primary color signals (R, G, B) and a luminance signal (Y);
      (2) means for comparing the first set of signal differences with a second set of signal differences corresponding to signal differences $(R-Y)_s$, $(B-Y)_2$, $(G-Y)_s$ between the primary color signals and the luminance signal for a chosen reference color and for providing a logic signal S when corresponding signal differences from the two sets of color differences are within a preset tolerance range (E); and
      (3) means for providing an output signal (Tx, Ty or T) containing information about the position of areas having a color corresponding to a chosen reference color on the basis of the logic signal S and signals (X, Y) controlling the image of the recorded surface in the video camera.

6. The video system of claim 5 wherein the means for comparing the first set of signal differences with a second set of signal differences, further comprises means for comparing the luminance signal (Y) generated from the primary color signal with the corresponding luminance signal (Ys) of the chosen reference color; and means to provide a logic signal S when the luminance signals of the recorded surface and that of the chosen reference color are within a preset tolerance range (E) in addition to the signal difference of the recorded surface and that of the chosen reference color.

7. The video system according to claim 6 wherein the means for comparing the first and second set of signals comprises comparators (23-25) for comparison of one or more of the signal differences and the luminance signals of the recorded surface and that of the chosen reference color, and logic AND-gate, the inputs of the logic AND-gate connected to the outputs of the comparators, in order to provide a logic signal S.

* * * * *

UNITED STATES PATENT AND TRADEMARK OFFICE
CERTIFICATE OF CORRECTION

PATENT NO. : 5,086,339
DATED : February 4, 1992
INVENTOR(S) : Ingebret Gausland

It is certified that error appears in the above-identified patent and that said Letters Patent is hereby corrected as shown below:

ON THE TITLE PAGE:
Abstract, line 6, change "difference" to --differences--.

Column 3, line 39, after "of" insert --the camera's--.

Column 4, line 5, change ")B-Y)-0" to --(B-Y)=0--.

Column 4, line 51, change "own" to --shown--.

Column 5, line 23, after "(CLK$_i$)" insert --.--.

Column 6, line 11, change "(S=1)" to --(S=0)--.

Column 7, line 28, after "set" insert --of--.

Column 7, line 30, change "signals" to --signal--.

Column 7, line 33, change "G-Y)" to --(G-Y)--.

Column 7, line 36, change "G-Y)" to --(G-Y)--.

Column 7, line 37, change "(R-Y$_s$" to --(R-Y)$_s$--.

UNITED STATES PATENT AND TRADEMARK OFFICE
CERTIFICATE OF CORRECTION

PATENT NO. : 5,086,339
DATED : February 4, 1992
INVENTOR(S) : Ingebret Gausland

It is certified that error appears in the above-identified patent and that said Letters Patent is hereby corrected as shown below:

Column 8, line 5, after "comprises:" insert the following:

--g) one or more digital circuits (37, 38) for formation of signals which are transformed in the D/A-convertors (32, 33) into analog signals for controlling of the horizontal and the vertical deflections (x, y) for the video camera (1), and h) a microprocessor-based steering and control unit (30, 31) which is capable of producing sets of signals for one or several reference colours which are transformed into analog signals in the D/A-converters (34, 36) and are led to the comparators according to point b) and c) (23-25), and which are capable of providing information in digital form based on signals from the digital circuit/circuits according to point g) (37, 38) and from the signal (S) from the logic AND-gate according to point d) (26).--.

Column 8, line 27, change "$(B-Y)_2$" to --$(B-Y)_s$--.

UNITED STATES PATENT AND TRADEMARK OFFICE
CERTIFICATE OF CORRECTION

PATENT NO. : 5,086,339

DATED : February 4, 1992

INVENTOR(S) : Ingebret Gausland

It is certified that error appears in the above-identified patent and that said Letters Patent is hereby corrected as shown below:

Column 8, line 48, change "difference" to --differences--.

Signed and Sealed this

Twentieth Day of July, 1993

Attest:

MICHAEL K. KIRK

*Attesting Officer*  Acting Commissioner of Patents and Trademarks